Figure 1:
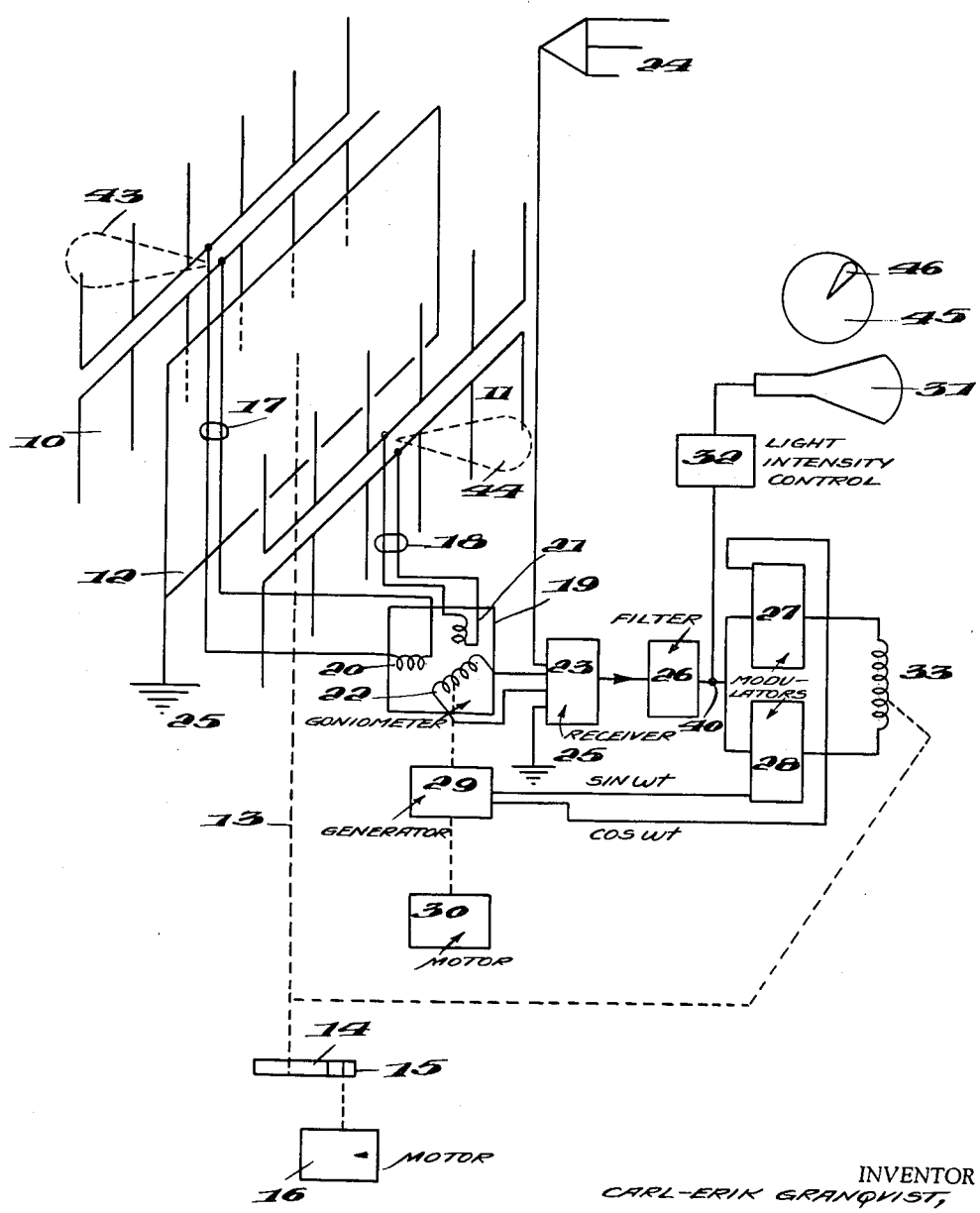

May 1, 1956  CARL-ERIK GRANQVIST  2,744,246
ARRANGEMENT FOR DIRECTED RECEPTION OF RADIO SIGNALS
Filed Nov. 19, 1951  2 Sheets-Sheet 1

INVENTOR
CARL-ERIK GRANQVIST,
BY Larson & C. Whiting
ATTORNEYS

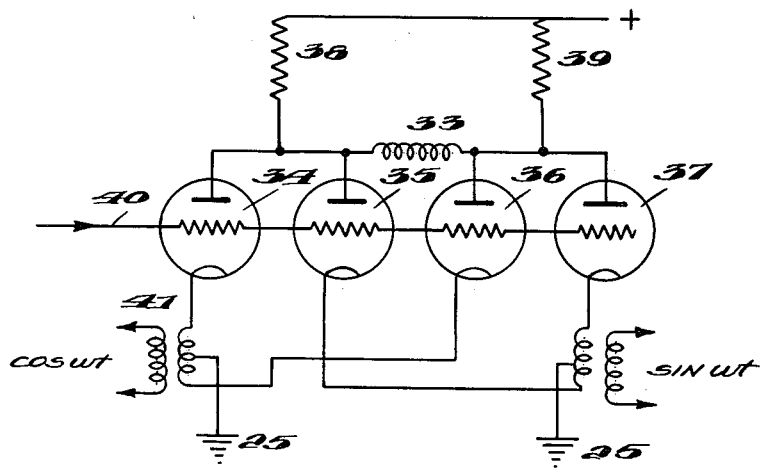

United States Patent Office 2,744,246
Patented May 1, 1956

2,744,246
ARRANGEMENT FOR DIRECTED RECEPTION OF RADIO SIGNALS

Carl-Erik Granqvist, Lidingo, Sweden, assignor to Svenska Aktiebolaget Gasaccumulator, Lidingo (near Stockholm), Sweden, a corporation of Sweden Application November 19, 1951, Serial No. 257,138

6 Claims. (Cl. 343—118)

Directed reception of radio signals is used, for instance in connection with radio direction finding, radar investigation of a range and so on. At such directed radio reception one has, amongst others, used a rotating antenna system with pronounced direction characteristic. Experience has, however, shown, that very often, essential errors may be introduced by input signals, reflected from the surroundings of the antenna system and causing a disturbing influence.

As an example, it may be assumed that the directed antenna system is of that kind, that its characteristic will follow a pure cardioidic curve, the mathematical form of which is $R = 1 - \cos \omega$, R indicating radius vector in a polar coordinate system, and $\omega$ indicating the rotational angle from the zero position. Assuming now, that due to an adjacent natural formation, a building or the like, a reflected wave will get into the antenna with a direction, deviating from the input direction of the direct wave by 90°, an assumption which will in no way mean a nonprobable relation, and that this reflected wave has a field intensity, corresponding to 0.1 R, one would find that the equation representing the error in indication will be: $0.1 = 1 - \cos \omega$, which will give $\omega =$ about 25°, that means a direction error of not less than 25° would emanate under the assumed circumstances.

Practice has also shown that with the known direction antennas one can get errors which rather often are in the order of magnitude not to be neglected. The errors will, of course, be more pronounced, the higher the frequency is, and the closer the objects are which disturb the reception by reflection. In ultra-high-frequency direction finding, used, for instance, for guiding an airplane into a landing path, one has thus found examples of error indication of 10° or more, with systems of types regarded as very good. One has assumed that in order to get a reasonably acceptable precision in direction finding with ultra-high-frequency signals, a reflection free space of at least 300 to 400 meters must be present, but as a rule such a large reflection free space is not at disposal, and besides, as a rule the pilot does not know, how large the reflection free space is, the direction finding being resorted to in just such cases, where the optical sight is not satisfactory.

The present invention is based upon the premises, that in order to decrease the abovementioned error indication caused by reflection, one should use an antenna system with a pronounced sharp direction characteristic. One example of such an antenna system is the so-called broadside dipole-antenna which is composed of a plurality of dipoles, arranged in the form of a frame work, for instance by being applied in parallel to each other in one level. Tests with such an antenna system, containing six dipoles, have proved that the greatest error indication, occurring under the worst conditions, imaginable in practice, was decreased from the abovementioned about 25° to less than 1°.

Such an antenna system has, however, other disadvantages. In order that it should search the space, it must be kept in rotation. It is, however, rather big, and consequently the maximum number of revolutions, allowed from practical reasons, is rather low. It may therefore occur that signals of short duration may get lost, because they are entering the antenna system during a phase of time, when the direction diagram of the antenna is not directed onto the source of the signal. This disadvantage will be especially important, if the antenna system is provided with a reflector which will prevent reception of the signal within an angle of 180°, and within the remaining 180° the signal is only received during the short moment of time during which the direction characteristic of the antenna system is turned onto the signal source.

According to the present invention, two antenna systems are provided on each side of a common (or possible two separate) reflectors, whereby the input signal is received two times during each rotation turn of the antenna system. Further, such arrangements are made that the received signals from each antenna are transferred to an indicator in such a way that confusion is prevented and the indication will be unambiguous. Further details of the invention will be evident from the following description of one form of execution of the invention in connection with the attached drawings, in which Fig. 1 shows a direction finding system according to the invention, partly in block-diagram, whereas Fig. 2 shows a detail of the arrangement according to Fig. 1.

In Fig. 1, the two dipole-antenna systems are indicated 10 and 11, respectively. Between them a reflector screen 12 is arranged. The whole system of antennas and reflector screen is built together into one unit, which is arranged on a shaft 13 kept in rotation by means of a cog-gear 14—15 and a motor 16.

The number of revolutions of the motor should, of course, be as high as possible, in order that the intervals during which reception is made impossible or difficult should be as small as possible, but from practical reasons an antenna system of the described kind cannot be kept in rotation with too high a speed. If each dipole-antenna has six elements, and the system is usable within the wavelength range corresponding to 100 to 150 megacycles per second, the system can be calculated to have a dimension of approximately 6 meter width and one meter height. The highest rotation speed of the antenna system will then be determined by the highest peripheral speed, as compared with the highest wind force present, as well as by the weight of the antenna system and its strength.

If the electrical part of the antenna system is made of aluminium or any other comparable light metal, the total weight may be in the order of magnitude of about 30 kilograms, and the rotational speed may be chosen to for instance one turn in 5 seconds, which will give a peripheral speed of about 3.5 meters a second, a value which is fully acceptable as compared with the occurring wind velocity. Due to the antenna system being doublefaced, the signal to be scanned will then be received one time every 2½ seconds. Thereby, the signal may, of course, be either transmitted from another transmitter or it may be a signal reflected in radar scanning. The shortest signals used in practice have a duration of 3 seconds, and it will then be understood that there is no risk that any signal shall get lost.

In the simplest case, one receiver may be connected to each of the two antennas, but such an arrangement will, of course, be very uneconomical, and it is obvious that it is desirable to use one single receiver for both of the signals received by the antennas in question. According to a further form of execution of the present invention this is made possible by the arrangement shown in Fig. 1.

The down leads 17 and 18, respectively, from the two antennas 10 and 11, respectively, are in this form of execution connected each to one coil system or corresponding means in a goniometer 19. The goniometer 19 may, of course, be inductive or capacitive, all according to the present conditions. In the form of execution according to Fig. 1, the goniometer is assumed to be inductive, but the invention is, of course, not limited in this respect. In the same way it has been assumed that the two coils 20 and 21, respectively, of the goniometer form the stator coils, coupled to a rotor coil 22, inductively coupled to them, but it is obvious that also the opposite may be the case. The coils 20 and 21 are arranged in a position, 90° displaced in relation to each other. The secondary coil 22, is, finally, connected to a receiver which may be of a kind known per se, in which the side band signal received from a rotating or comparable antenna system is combined with an unmodulated signal received from a non-directional antenna system. The receiver, in the drawing indicated 23, is for this purpose combined with the non-directed antenna system 24 and with ground 25.

After the receiver 23 is, in the development way of the signal, provided a filter circuit 26 and two modulators 27 and 28 in which the filtered signal is modulated with a phase indicating reference oscillation. This is obtained from a generator 29, by the motor 30 driven syngonously with the goniometer 19. By syngonously it is meant that the shaft of the motor 30 and the shaft of the goniometer 19 are not only moving synchronously (at the same speed), but they are also moving in a given mutual angular position. The rotation speed of these means can be chosen quite independent of the antenna system. For instance, the motor 30 may be provided as a 50-period three-phase motor, so that its number of revolutions may be about 50 revolutions a second. The generator 29 is, however, arranged as a two-phase generator, so that two oscillations are obtained, mutually displaced in phase by 90°, in the figure indicated by sin $\omega t$ and cos $\omega t$, respectively.

A cathode ray tube 31 is fed over a light-intensity control device 32 from the output side of the filter arrangement 26, simultaneously as the deflecting coil 33 of said cathode ray tube is fed with the difference between the output voltages from the modulators 27 and 28. The deflecting coil may, of course, be kept rotating, or a system of deflecting coils with directional action may be provided. In the present case, the deflecting coil is assumed to be driven from the motor 16 over the cog gearing 14–15, so that it rotates mechanically syngonously with the antenna system 10–11–12.

Fig. 2 shows an arrangement of the modulators 27 and 28. In this arrangement four triode systems 34, 35, 36 and 37 are used, the anodes of which being connected in pairs, so that the anodes of the systems 34 and 35 work on a common anode resistor 38 and the anodes of the triode systems 36 and 37 in a corresponding way work on a common anode resistor 39. The four control grids are mutually connected to the conduit 40 from the filter arrangement 26, whereas the cathodes are connected to ground over the T-coupled secondary sides of transformers 41 and 42, respectively. The center point of the secondary windings is thus connected to ground, whereas each terminal of the secondary winding is connected to a cathode in some of the tubes 34, 35, 36, and 37. Thus, the terminals of the secondary winding of the transformer 41 are connected to the cathodes of the tubes 34 and 36, and correspondingly, the terminals of the secondary winding of the transformer 42 are connected to the cathodes of the electron tubes 35 and 37. The primary sides of the transformers 41 and 42, respectively, are connected to the two reference signals from the generator 29. It should be observed, that in this way the sinus oscillation is fed to the cathode of tubes 35 and 37, mutually in phase opposition, whereas the cosinus oscillation will, correspondingly, in phase opposition be fed to the cathodes of the tubes 34 and 36. The deflecting coil 33 finally, is connected between the anode circuits of the two modulators, as evident from Fig. 2.

The arrangement functions in the following way: During the rotation of the antenna system, alternatively the one and the other one of the antenna systems will, during a short moment of time have such a direction, that that signal is picked up, the direction of which should be localized. The intensity of the received signal is determined by the direction characteristics of the antenna systems, in Fig. 1 drawn at the side of each of the antenna systems as the curves 43 and 44, respectively. The two signals, thus received at different times are fed to the goniometer 19 in such a way that a phase difference of 90° is introduced, the signals thereby obtaining a characteristic, determined by the phase position. The signals thus received hace only the character of side bands, and they are provided with a carrier wave in the receiver in a known manner, received by the non-directed antenna 24, the signal thereafter being filtered in the filter device 26, where it is also demodulated. The demodulated signal is fed to the control means of the cathode ray tube 31, so that a figure is drawn on the screen 45 of this tube, when the deflecting coil is rotating. Now, however, the rotation speed of the deflecting coil is essentially lower than the electrical angular velocity of the demodulated signal, because the latter is determined by the rotation speed of the goniometer. As a matter of fact, the curve 46 drawn on the screen 45 will therefore be composed of a great number of radially divided partial curves at the side of each other, clearly visible at close range. At a certain distance, the figure 46 will therefore appear as a coherent light surface which unambiguously indicates the incidence direction of the signal.

As mentioned above, the invention is not limited to be used only for real direction finding or for direction finding of an input signal from a transmitter, but it can with the same advantage be used in connection with direction finding of a signal which has been transmitted from the receiver place and by reflection re-radiated to the receiver place, in the way known under the denomination radar. Also in other respects the described arrangement can be subjected to modifications within the scope of the invention. For instance, it is not at all necessary for the invention that a mechanically rotating goniometer 19 is used, but with equal advantage, an electrical goniometer, a so-called modulation goniometer, of a kind known per se may be used. Nor is the invention limited to the use of an antenna system of the specific kind, shown in the drawing, but other antenna systems with emphasized direction action could be used with the same advantage.

What is claimed is:

1. An arrangement for directive reception of radio signals, comprising a plurality of direction antennas arranged in relation to each other so that their directional characteristics are widely apart from each other, means for rotating said antennas at mutually corresponding speed, reflector means mutually separating said antennas, a rotational goniometer, means for feeding the signals emanating from the respective antennas to means in the said rotational goniometer for creating fields in said goniometer with a direction, corresponding to the directions of the signals, received by the said directional antennas, the signals thereby occurring in the output of the goniometer as one single series of signals corresponding to the signals picked up by means of said antennas, and with a frequency determined by the rotation speed of the goniometer, and with a phase position determined by the incidence direction of the signals picked up by means of the antennas, an indicator for indicating the direction of the received radio frequency signal, and means for subjecting this indicator to a rotating field, means for detecting the output voltage from said goniometer, and means for connecting said detection means output to said indicator.

2. An arrangement according to claim 1, in which the directional antennas consist of a plurality of dipole-antennas arranged in a common level.

3. An arrangement according to claim 1, in which the antennas are connected to said means for providing a mechanical rotation and said indicator is arranged to be controlled by means of a field rotating syngonously therewith.

4. An arrangement according to claim 3, in which the goniometer is arranged to rotate with an essentially higher speed than the antennas for creating the phase indicating signals.

5. An arrangement according to claim 4, in which the goniometer is driven by a motor, a generator generating a reference voltage, means applying said generated voltage to demodulating means for demodulation of the output oscillation from the goniometer.

6. An arrangement according to claim 5, comprising two antennas, said mutually displaced means in the goniometer being of such a kind that there will occur a phase displacement of 90° in the output signal from said goniometer, means in said generator for creating two reference voltage oscillations displaced in phase by 90°, means imposing the signal demodulated by means of these oscillations on the means for creating the rotating field of the indicator, and means simultaneously imposing the non-demodulated signal on the signal of the indicator.

References Cited in the file of this patent
UNITED STATES PATENTS

| | | |
|---|---|---|
| 2,396,112 | Morgan | Mar. 5, 1946 |
| 2,443,718 | Blodgett | June 22, 1948 |
| 2,464,558 | Dammers | Mar. 15, 1949 |
| 2,475,612 | Hansel | July 12, 1949 |
| 2,571,051 | Mizen | Oct. 9, 1951 |